US007486719B2

(12) United States Patent
Ozawa

(10) Patent No.: US 7,486,719 B2
(45) Date of Patent: Feb. 3, 2009

(54) TRANSCODER AND CODE CONVERSION METHOD

(75) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 677 days.

(21) Appl. No.: 11/118,346

(22) Filed: May 2, 2005

(65) Prior Publication Data

US 2005/0207502 A1 Sep. 22, 2005

Related U.S. Application Data

(63) Continuation of application No. PCT/JP03/012859, filed on Oct. 8, 2003.

(30) Foreign Application Priority Data

Oct. 31, 2002 (JP) ............................ 2002-317204

(51) Int. Cl.
*H04B 1/38* (2006.01)
*H04L 5/16* (2006.01)

(52) U.S. Cl. ....................... 375/219; 375/220; 375/229; 375/240.12; 375/240.29; 704/221; 704/219

(58) Field of Classification Search ................. 375/219, 375/220, 229, 240, 240.12, 240.29, 26; 704/221, 704/219, 220, 225, 258, 262
See application file for complete search history.

(56) References Cited

U.S. PATENT DOCUMENTS 5,953,698 A * 9/1999 Hayata ....................... 704/230
5,978,759 A 11/1999 Tsushima et al.
6,724,851 B2 * 4/2004 Critchlow et al. ........... 375/377

(Continued)

FOREIGN PATENT DOCUMENTS

CA 2 437 314 8/2002

(Continued)

OTHER PUBLICATIONS

P. Jax et al., "Wiseband extensionof Telephone Speech Using Hidden Markov Model", Poc. IEEE Speech Coding Workship, pp. 133-135, 2000.

(Continued)

*Primary Examiner*—Phuong Phu
(74) *Attorney, Agent, or Firm*—Young & Thompson

(57) ABSTRACT

A two-way conversion transcoder comprising a spectrum parameter calculation circuit that calculates a spectrum parameter for a signal produced by decoding a first code; a coefficient calculation circuit that receives the spectrum parameter and converts it to the coefficients of a band extended signal, a noise generation circuit that outputs a band-limited noise signal, a gain circuit that multiplies the output signal of the noise generation circuit by a gain, a synthesis filter circuit that receives the output signal from the noise generation circuit and the coefficients from the coefficient calculation circuit and outputs a high frequency signal for band extension, a sampling frequency conversion circuit that outputs a signal generated by up-sampling the signal to a predetermined sampling frequency, an adder that adds up a high-frequency signal and the signal to form a band extended signal, and a second encoding circuit that encodes the band extended signal by a second encoding method and outputs the encoded signal.

31 Claims, 6 Drawing Sheets

U.S. PATENT DOCUMENTS

| | | | | |
|---|---|---|---|---|
| 6,829,579 | B2 * | 12/2004 | Jabri et al. | 704/221 |
| 6,865,534 | B1 * | 3/2005 | Murashima et al. | 704/262 |
| 6,910,009 | B1 * | 6/2005 | Murashima | 704/225 |
| 2002/0038210 | A1 | 3/2002 | Yajima et al. | |

FOREIGN PATENT DOCUMENTS

| | | |
|---|---|---|
| JP | 63-217732 | 9/1988 |
| JP | 7-56598 | 3/1995 |
| JP | 8-123495 | 5/1996 |
| JP | 8-248997 | 9/1996 |
| JP | 9-18347 | 1/1997 |
| JP | 9-127985 | 5/1997 |
| JP | 2000-10597 | 1/2000 |
| JP | 2000-181497 | 6/2000 |
| JP | 2000-200099 | 7/2000 |
| JP | 2000-206995 | 7/2000 |
| KR | 2001-0102004 | 11/2001 |
| WO | WO 00/48170 | 8/2000 |
| WO | WO 02/080147 | 10/2002 |

OTHER PUBLICATIONS

Sugamura et al., "Speech InformationCompression by Voice Analysis Synthesis System", Extended Abstract Society of Electronic Communication, J64-A, pp. 599 r-606, 1981.

* cited by examiner

TRANSCODER AND CODE CONVERSION METHOD

CROSS-REFERENCE TO RELATED APPLICATIONS

This application is a continuation of International Application No. PCT/JP2003/012859, filed on Oct. 8, 2003, and claims priority to Japanese Patent Application No. 2002-317204 filed on Oct. 31, 2002, both of which are incorporated herein by reference in their entireties.

TECHNICAL FIELD

The present invention relates to a transcoder that performs inter-conversion between a code encoded in accordance with a first encoding method and a code encoded in accordance with a second encoding method, and more particularly to a transcoder that extends the frequency band of a signal when a first code is converted to a second code.

BACKGROUND ART

A method is known that is used by the receiving side to extend the frequency band of a speech signal, which is encoded and reproduced at a low-bit rate, without transmitting auxiliary information for band extension from the sending side (for example, Non-Patent Document 1).

Non-Patent Document 1: P.Jax, P.Vary, "Wideband extension of telephone speech using hidden markov model," Proc. IEEE Speech Coding Workshop, pp. 133-135, 2000

According to the conventional method described in Document 1 described above, the receiving side uses an HMM (Hidden Markov Model) to search for filter coefficients after band extension.

On the other hand, there has been no transcoder that performs inter-conversion between a code encoded in accordance with a first encoding method and a code encoded in accordance with a second encoding method by extending the frequency band of a signal before conversion when converting from a first code to a second code.

The conventional method described in the document described above (Non-Patent Document 1 described above) by P.Jax and P.Vary, which requires the spectrum envelope of a wideband speech and the HMM-based modeling of filter coefficients, has the following problems.

That is, the HMM model parameters must be determined offline from a large-volume speech database in advance, and this processing requires long computation time and high costs.

In addition, the receiving side where the band is extended in real time must perform HMM-model-based search processing that requires a large amount of computation.

SUMMARY OF THE DISCLOSURE

Accordingly, it is a major object of the present invention to provide a transcoder and a code conversion method, for use when a transcoder that performs inter-conversion between a code encoded in accordance with a first encoding method and a code encoded in accordance with a second encoding method performs code conversion from a first code to a second code, that can perform good sound-quality band extension with a relatively small amount of computation when extending the frequency band of a signal before conversion.

According to one aspect of a transcoder according to the present invention, there is provided a transcoder that performs inter-conversion between a code encoded in accordance with a first encoding method and a code encoded in accordance with a second encoding method. According to a first aspect, the transcoder comprises a spectrum parameter calculating unit that receives a code encoded by the first encoding method, decodes the received code by the first encoding method, and calculates a spectrum parameter representing spectrum characteristics; a noise generating unit that generates a noise signal; a coefficient calculating unit that shifts a frequency of the spectrum parameter and calculates filter coefficients; a gain unit that applies an appropriate gain to the output of the noise generating unit; a synthesis filter unit that lets the output of the gain unit pass through a synthesis filter, configured by the coefficients, and reproduces a band extended signal; and an adder that converts the sampling frequency of the input signal, adds up the converted signal and the output signal of the synthesis filter unit, and outputs the resulting signal, and then encodes the output signal of the adder in accordance with the second encoding method to output a second code.

According to a second aspect of a transcoder according to the present invention, there is provided a transcoder that performs inter-conversion between a code encoded in accordance with a first encoding method and a code encoded in accordance with a second encoding method. The transcoder comprises a spectrum parameter calculating unit that receives a code encoded by the first encoding method, decodes the received code by the first encoding method, and calculates a spectrum parameter representing spectrum characteristics; an adaptive codebook unit that calculates a pitch period from the input signal and generates an adaptive codebook component based on the pitch period and a past sound source signal; a noise generating unit that generates a noise signal; a coefficient calculating unit that shifts a frequency of the spectrum parameter and calculates filter coefficients; a gain unit that applies an appropriate gain to at least one of the output signal of the noise generating unit and the output of the adaptive codebook unit and adds up the signals to output a sound source signal; a synthesis filter unit that lets the sound source signal pass through a synthesis filter configured by the coefficients to reproduce a band extended signal; and an adder that converts the sampling frequency of the reproduced signal and adds up the converted signal and the output signal of the synthesis filter unit and outputs the resulting signal, and then encodes the output signal of the adder in accordance with the second encoding method to produce and output a second code.

According to a third aspect of a transcoder according to the present invention, there is provided a transcoder that performs inter-conversion between a code encoded in accordance with a first encoding method and a code encoded in accordance with a second encoding method. The transcoder comprises a spectrum parameter calculating unit that receives a code encoded by the first encoding method, decodes the received code by the first encoding method, and calculates a spectrum parameter representing spectrum characteristics; an adaptive codebook unit that calculates a pitch period from the input signal and generates an adaptive codebook component based on the pitch period and a past sound source signal; a noise generating unit that generates a noise signal; a coefficient calculating unit that shifts a frequency of the spectrum parameter and calculates filter coefficients; a gain unit that applies an appropriate gain to at least one of the output of the noise generating unit and the output of the adaptive codebook unit and adds up the signals to output a sound source signal; a synthesis filter unit that lets the sound source signal pass through a pitch pre-filter using the pitch period and that lets the output signal of the pitch pre-filter pass through a synthesis filter configured by the coefficients to reproduce a band extended signal; and an adder that converts the sampling frequency of the reproduced signal and adds up the converted signal and the output signal of the synthesis filter unit and outputs the resulting signal, and then encodes the output signal of the adder in accordance with the second encoding method to produce and output a second code.

According to the present invention, the transcoder may further comprise a low-pass filter with a predetermined cutoff frequency through which the output of the adaptive codebook unit passes.

In addition, according to the present invention, the transcoder may further comprise a post filter which is configured by weighting coefficients generated by giving weight to the coefficients and through which the output signal of the synthesis filter unit passes to reproduce the band extended signal.

According to one aspect of a method of the present invention, there is provided a code conversion method for use by a transcoder that performs inter-conversion between a code encoded in accordance with a first encoding method and a code encoded in accordance with a second encoding method. The method comprises a step of decoding a code in accordance with a first decoding method and outputting a decoded signal, the code encoded by the first encoding method;

a step of calculating a spectrum parameter from the decoded signal and outputting the spectrum parameter, the spectrum parameter representing spectrum characteristics;

a step of shifting a frequency of the spectrum parameter, calculating filter coefficients, and outputting the calculated filter coefficients;

a step of applying a gain to an output signal from a noise generating unit;

a step of letting the output signal, to which the gain was applied, pass through a synthesis filter to output a signal of a band required for band conversion, the synthesis filter configured by the filter coefficients;

a step of adding up a signal, which is generated by converting the decoded signal using a predetermined sampling frequency, and the output signal of the synthesis filter; and a step of encoding the addition result in accordance with the second encoding method to produce and output a second code.

According to another aspect of a method of the present invention, there is provided a code conversion method comprising:

a step of decoding a code in accordance with a first decoding method and outputting a decoded signal, the code encoded by the first encoding method;

a step of calculating a spectrum parameter from the decoded signal and outputting the spectrum parameter, the spectrum parameter representing spectrum characteristics;

a step of calculating a pitch period from the decoded signal and, based on the pitch period and a past sound source signal, generating an adaptive codebook component;

a step of shifting a frequency of the spectrum parameter, calculating filter coefficients, and outputting the calculated filter coefficients;

a step of applying a gain to at least one of a output from a noise generating unit and the adaptive codebook component and adding up the signals to output a sound source signal;

a step of letting the sound source signal pass through a synthesis filter to output a signal of a band required for band conversion, the synthesis filter configured by the filter coefficients;

a step of adding up a signal, which is generated by converting the decoded signal using a predetermined sampling frequency, and the output signal of the synthesis filter; and a step of encoding the addition result in accordance with the second encoding method to produce and output a second code.

According to another aspect of a method of the present invention, there is provided a code conversion method comprising:

a step of decoding a code in accordance with a first decoding method and outputting a decoded signal, the code encoded by the first encoding method;

a step of calculating a spectrum parameter from the decoded signal and outputting the spectrum parameter, the spectrum parameter representing spectrum characteristics;

a step of calculating a pitch period from the decoded signal and, based on the pitch period and a past sound source signal, generating an adaptive codebook component;

a step of shifting a frequency of the spectrum parameter, calculating filter coefficients, and outputting the calculated filter coefficients;

a step of applying a gain to at least one of a noise output from a noise generating unit and the adaptive codebook component and adding up the signals to output a sound source signal;

a step of performing pitch pre-filtering for the sound source signal using the pitch period;

a step of passing the pitch pre-filtered signal through a synthesis filter to output a signal of a band required for band conversion, the synthesis filter configured by the filter coefficients;

a step of adding up a signal, which is generated by converting the decoded signal using a predetermined sampling frequency, and the output signal of the synthesis filter; and a step of encoding the addition result in accordance with the second encoding method to produce and output a second code.

According to another aspect of the method of the present invention, the method may further comprise a step of performing pre-filtering processing for the sound source signal from the gain unit using the pitch period in the pitch pre-filter and letting the output signal from the pitch pre-filter pass through the synthesis filter circuit.

According to another aspect of the method of the present invention, the method may further comprise a step of letting the output signal of the synthesis filter unit pass through a post filter configured by weighted coefficients generated by applying weight to the filter coefficients from the coefficient calculating unit.

According to another aspect of the method of the present invention, the output of the periodic signal generation unit that generates the periodic signal using the pitch period may be supplied to the gain unit instead of the output signal from the adaptive codebook unit.

When code encoded by a first encoding method is received and is converted to code encoded in accordance with the second encoding method for output, the present invention extends the band of the signal before conversion, generates a high-frequency signal through relatively small calculation, and adds up the resulting signal and the narrowband input signal, whose sampling frequency is converted, to produce a band extended signal (for example, 7 kHz band).

The present invention also generates an adaptive codebook signal using a delay calculated from the narrowband input signal based on a past sound source signal in the high-frequency part, multiplies the signal by an appropriate gain, and adds up the signal and the noise signal to generate a good sound-quality, band-extended signal when periodicity is required for a high-frequency signal such as a vowel sound.

In addition, the present invention may comprise a pitch pre-filter for the sound source signal using a delay or a post filter configured by giving weight to the coefficients from the coefficient calculation circuit to generate a better sound-quality, band-extended signal.

PREFERRED EMBODIMENTS OF THE INVENTION

Embodiments will be described with reference to the drawings to describe the present invention more in detail. In the description below, it is assumed that a first code is generated by encoding a narrowband input signal, 4 kHz in band, and that a transcoder extends this signal into a 5 KHz or 7 KHz band signal and encodes the signal by a second encoding method to produce a second code.

Figure 1:
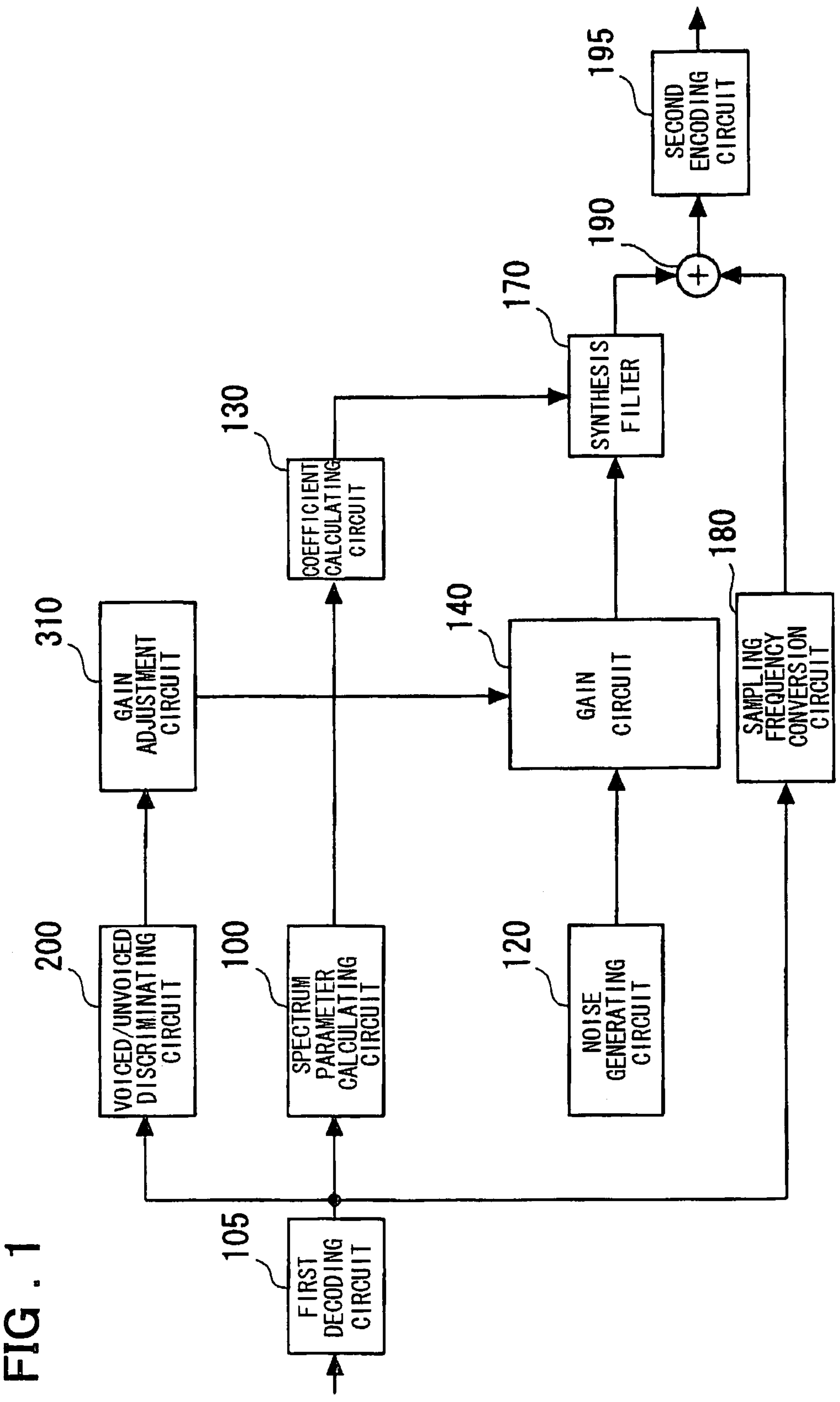
FIG. 1 is a diagram showing the configuration of a first embodiment of the present invention.

FIG. 1 is a block diagram showing the configuration of a first embodiment of a transcoder according to the present invention. Referring to FIG. 1, the transcoder comprises a first decoding circuit 105, a spectrum parameter calculation circuit 100, a noise generation circuit 120, a coefficient calculation circuit 130, a synthesis filter circuit 170, a sampling frequency conversion circuit 180, an adder 190, a second encoding circuit 195, a voiced/unvoiced discriminating circuit 200, a gain adjustment circuit 310, and a gain circuit 140.

The first decoding circuit 105 receives a code encoded by the first encoding method, decodes the received code in accordance with the first decoding method, and outputs a decoded signal x(n).

The spectrum parameter calculation circuit 100 divides the decoded signal x(n) into frames (for example, 10 ms) and calculates the spectrum parameters of a predetermined order P for each frame. The spectrum parameters are parameters representing the spectrum outline of the speech signal of each frame, and the known LPC (Linear Predictive Coding) analysis is used for this calculation. In addition, the spectrum parameter calculation circuit 100 converts the linear predictive coefficients $\alpha i$ (i=1, . . . P), calculated by the LPC analysis, to LSP (Line Spectrum Pair) parameters suitable for quantization or interpolation and outputs the converted parameters. For the conversion from linear predictive coefficients to LSP, refer to the following paper (Non-Patent Document 2).

Non-Patent Document 2: Sugamura, Itakura "Speech Information Compression by Line Spectrum Pair (LSP) Speech Analysis and Synthesis Method", Journal of Institute of Electronics, Information and Communication Engineers, J64-A, pp. 599-606, 1981

The coefficient calculation circuit 130 receives the spectrum parameters output from the spectrum parameter calculation circuit 100 and converts the parameters to the coefficients of a signal whose band is extended. For this conversion, any of known methods such as the method for simply shifting the frequency of the LSP to a higher frequency, the non-linear conversion method, and the linear conversion method can be used. In this embodiment, the frequency band of the LSP is shifted to a higher frequency band using all or a part of LSP parameters, and the parameters are converted to the linear predictive coefficients of the order P and are output to the synthesis filter circuit 170.

The noise generation circuit 120 generates a noise signal, whose average amplitude is normalized to a predetermined level and whose band is limited, for the length of time equal to the frame length and outputs the generated noise signal to the gain circuit 140. Although a white noise is used as an example of the noise signal in this embodiment, other noise signals may also be used.

The voiced/unvoiced discriminating circuit 200 receives the narrowband input signal x(n) and determines whether the signal of each frame is voiced or unvoiced. To determine whether the signal is voiced or unvoiced, the normalized auto-correlation function D(T) of the narrowband input signal x(n) is calculated up to a predetermined delay time m using expression (1) to find the maximum value of D(T). If the maximum value of D(T) is larger than a predetermined threshold value, the signal is determined to be voiced; otherwise the signal is determined to be unvoiced.

$$D(T) = \left[\sum_{n=0}^{N-1} x(n)x(n-T)\right] \Big/ \left[\sum_{n=0}^{N-1} x^2(n-T)\right] \tag{1}$$

The voiced/unvoiced discriminating circuit 200 outputs the voiced/unvoiced discrimination information to the gain adjustment circuit 210. N in expression (1) is the number of samples used for calculating the normalized auto-correlation.

The gain adjustment circuit 310 receives the voiced/unvoiced discrimination information from the voiced/unvoiced discriminating circuit 200 and, according to whether the signal is voiced or unvoiced, adjusts the gain to be given to the noise signal and outputs the adjusted gain to the gain circuit 140.

The gain circuit 140 receives the gain from the gain adjustment circuit 310, multiples the output signal from the noise generation circuit 120 by the gain, and outputs the result to the synthesis filter circuit 170.

The synthesis filter circuit 170 receives the output signal from the gain circuit 140, receives the coefficients of a predetermined number of orders from the coefficient calculation circuit 130 to configure a filter, and outputs a high frequency signal y(n) required for band extension.

The sampling frequency conversion circuit 180 up-samples the narrowband input signal x(n) to a predetermined sampling frequency and outputs an up-sampled signal s(n).

The adder 190 adds up the output signal y(n) from the synthesis filter circuit 170 and the output signal s(n) from the sampling frequency conversion circuit 180, and forms and outputs a signal z(n) whose band has been extended.

The second encoding circuit 195 receives the output signal z(n) from the adder 190, encodes the signal in accordance with the second encoding method, and produces and outputs the second code.

The first embodiment is as described above.

Figure 2:
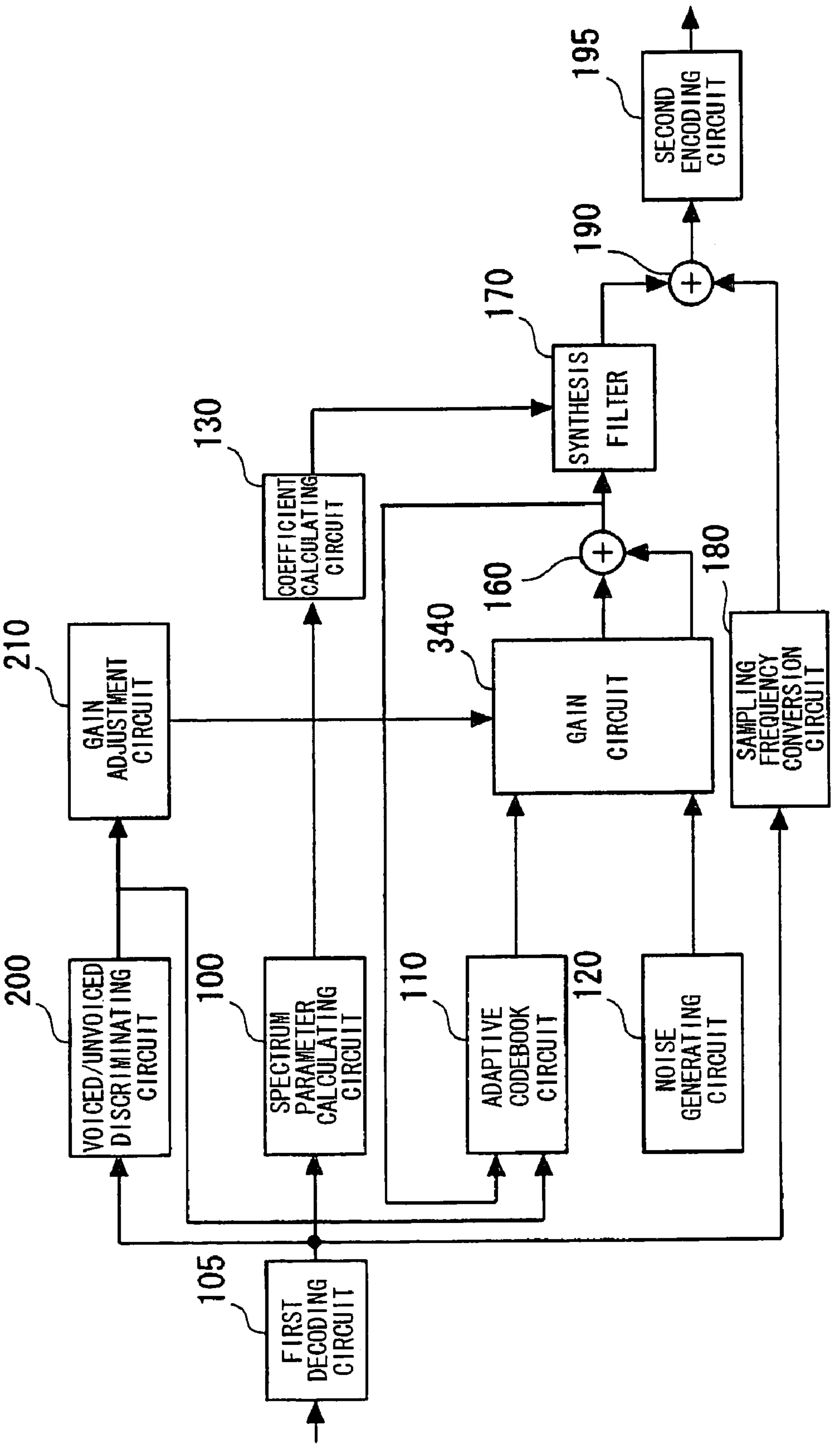
FIG. 2 is a diagram showing the configuration of a second embodiment of the present invention.

FIG. 2 is a block diagram showing the configuration of a second embodiment of the present invention. Referring to FIG. 2, a transcoder in the second embodiment of the present invention comprises a first decoding circuit 105, a spectrum parameter calculation circuit 100, an adaptive codebook circuit 110, a noise generation circuit 120, a coefficient calculation circuit 130, a gain circuit 340, a synthesis filter circuit 170, a sampling frequency conversion circuit 180, an adder 160, an adder 190, a second encoding circuit 195, a voiced/unvoiced discriminating circuit 200, and a gain adjustment circuit 210. In FIG. 2, the same reference numeral is used to denote the same element in FIG. 1. The following mainly describes the difference from the first embodiment and omits the description of the same elements as those in FIG. 1 if not necessary. Referring to FIG. 2, the second embodiment of the present invention is similar to the first embodiment except that the adaptive codebook circuit 110 and the adder 160 are added to the configuration in FIG. 1.

The voiced/unvoiced discriminating circuit 200 receives the narrowband input signal x(n) and determines whether the signal of each frame is voiced or unvoiced. To determine whether the signal is voiced or unvoiced, the normalized auto-correlation function D(T) of the narrowband input signal x(n) is calculated up to a predetermined delay time m using expression (1) described above to find the maximum value of D(T). If the maximum value of D(T) is larger than a predetermined threshold value, the signal is determined to be voiced; otherwise the signal is determined to be unvoiced. The determination result is output to the gain adjustment circuit 210.

For a voiced frame, the voiced/unvoiced discriminating circuit 200 supplies the value of T, which maximizes the normalized auto-correlation function D(T), to the adaptive codebook circuit 110 as the pitch period T.

The adaptive codebook circuit 110 receives the delay T of the adaptive codebook from the voiced/unvoiced discriminating circuit 200, generates an adaptive code vector p(n) according to expression (2) shown below based on the past sound source signal v(n), and outputs the generated vector.

$$p(n)=v(n-T) \quad (2)$$

The gain adjustment circuit 210 receives the voiced/unvoiced discrimination information from the voiced/unvoiced discriminating circuit 200, adjusts the gain of the adaptive codebook signal and the gain of the noise signal according to whether the signal is voiced or unvoiced, and supplies the adjusted gain to the gain circuit 340.

The gain circuit 340 receives the gain from the gain adjustment circuit 210, multiplies the output signal of at least one of the adaptive codebook circuit 110 and the noise generation circuit 120 by the gain, and outputs the result to the adder 160.

The adder 160 adds up two types of signal (two signals generated by multiplying the output signal of at least one of the adaptive codebook circuit 110 and the noise generation circuit 120 by the gain) output from the gain circuit 340 and outputs the result to the synthesis filter circuit 170 and the adaptive codebook circuit 110.

The synthesis filter circuit 170 receives the output signal from the adder 160, receives the coefficients (filter coefficients) of a predetermined number of orders from the coefficient calculation circuit 130 to configure a filter, and outputs a high frequency signal y(n) required for band extension.

The transcoder in the second embodiment of the present invention generates the adaptive codebook signal using the delay, calculated from the narrowband input signal, based on the past sound source signal of a high frequency part, multiplies the generated adaptive codebook signal by an appropriate gain, and adds up the resulting signal and the noise signal. Therefore, the transcoder can generate a good sound-quality band-extended signal required when periodicity is required for a high-frequency signal such as a vowel sound. The second embodiment is as described above.

Figure 6:
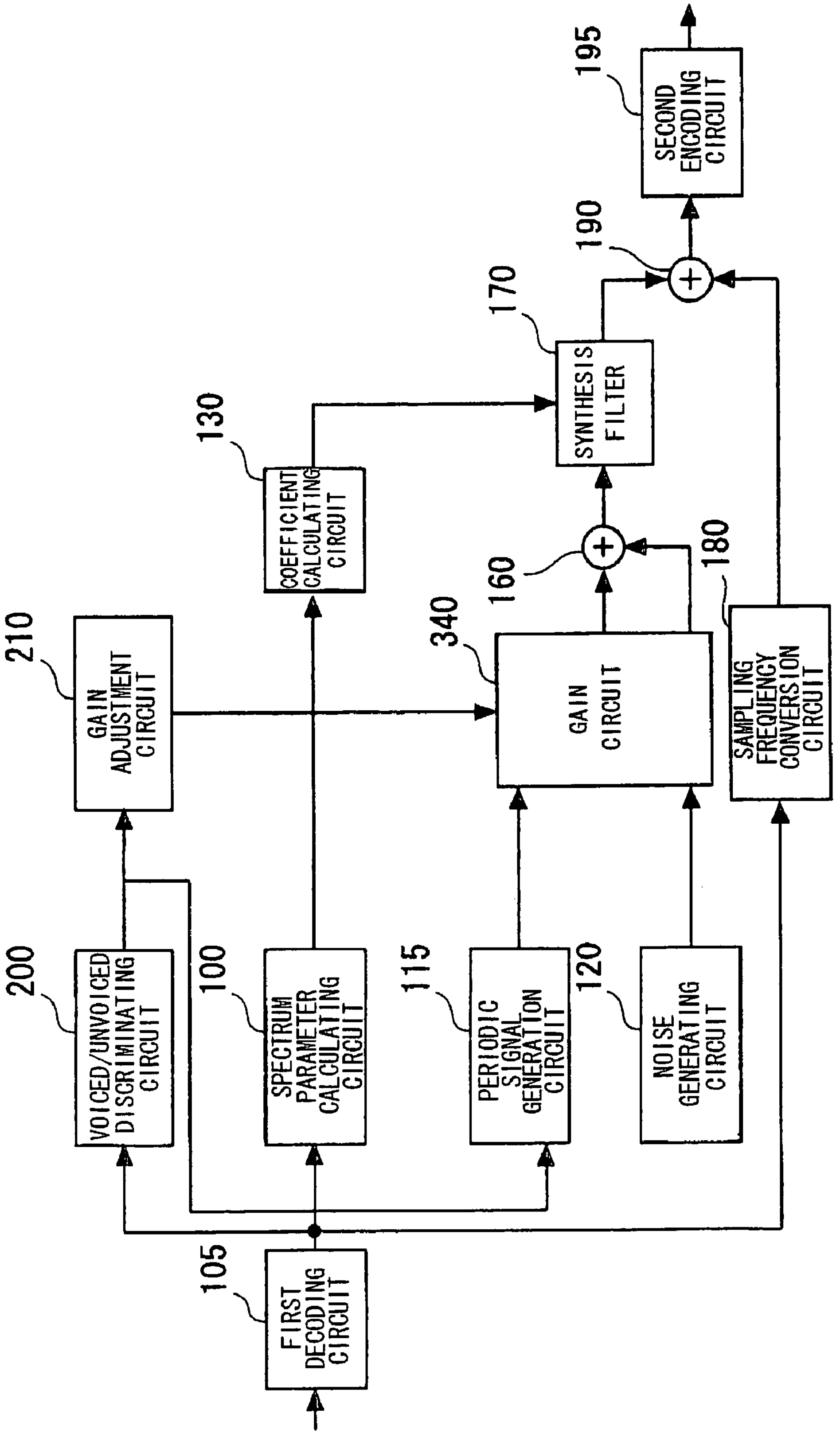
FIG. 6 is a diagram showing a modification of the second embodiment of the present invention.

As a modification of the second embodiment of the present invention, a periodic signal generation circuit 115 may be provided as shown in FIG. 6 instead of the adaptive codebook circuit 110 in FIG. 2. The periodic signal generation circuit 115 receives a pitch period from the voiced/unvoiced discriminating circuit 200 and, using the pitch period, generates a periodic signal and outputs it to the gain circuit 340. The configuration of this modification is similar to that of the second embodiment except the periodic signal generation circuit 115.

Figure 3:
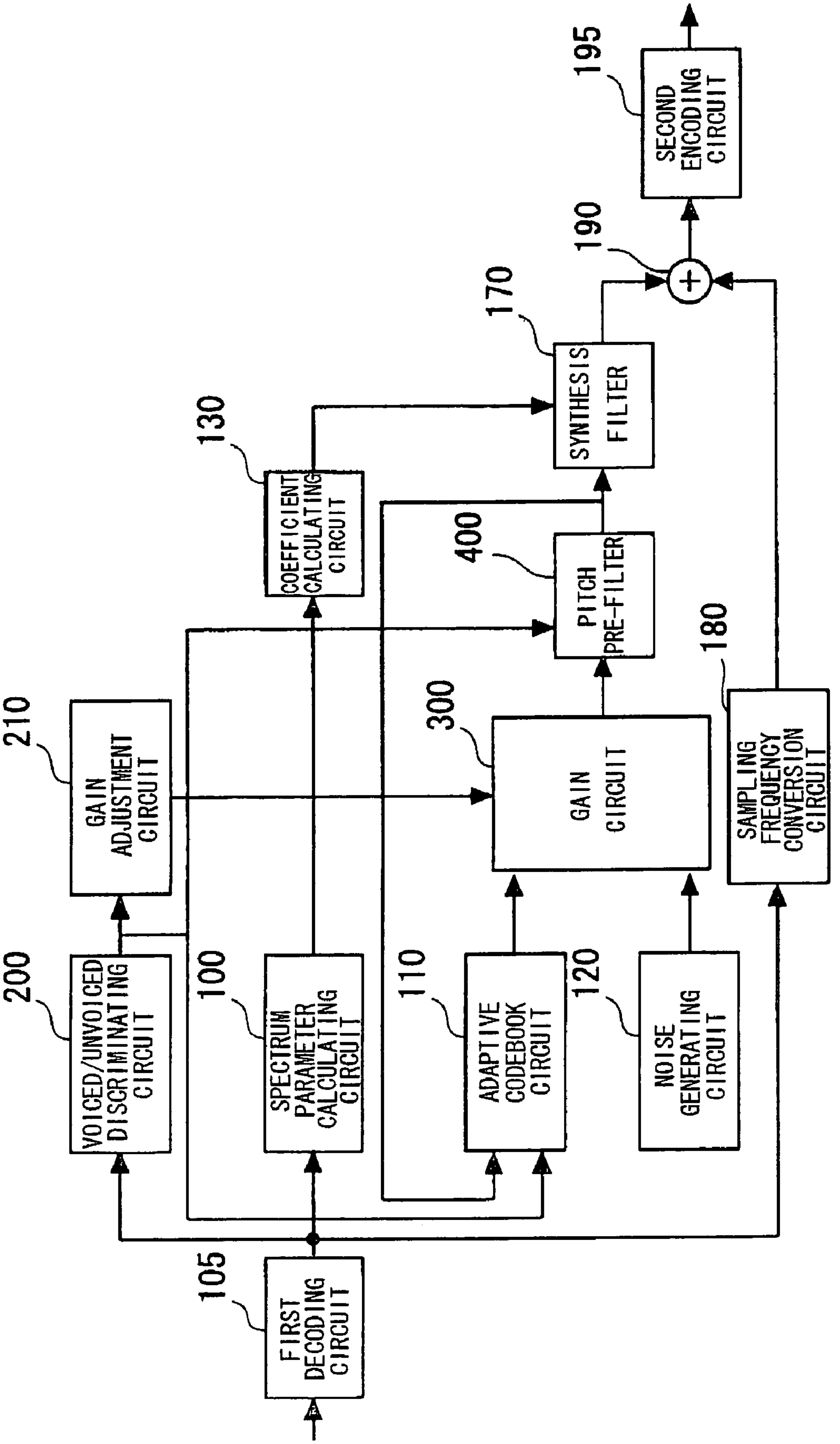
FIG. 3 is a diagram showing the configuration of a third embodiment of the present invention.

FIG. 3 is a block diagram showing the configuration of a third embodiment of the present invention. Referring to FIG. 3, a transcoder in the third embodiment of the present invention comprises a first decoding circuit 105, a spectrum parameter calculation circuit 100, an adaptive codebook circuit 110, a noise generation circuit 120, a coefficient calculation circuit 130, a gain circuit 300, a synthesis filter circuit 170, a sampling frequency conversion circuit 180, an adder 190, a second encoding circuit 195, a voiced/unvoiced discriminating circuit 200, a gain adjustment circuit 210, and a pitch pre-filter circuit 400. In FIG. 3, the same reference numeral is used to denote the same or equivalent element in FIG. 1 and FIG. 2. The following mainly describes the difference from the second embodiment and omits the description of the same elements as those in FIG. 1 and FIG. 2. In this embodiment, the pitch pre-filter circuit 400 is provided.

The gain circuit 300 receives a gain from the gain adjustment circuit 210, multiplies the output signals from the adaptive codebook circuit 110 and the noise generation circuit 120 by the gain and adds up the resulting two types of signal, and outputs the addition result to the pitch pre-filter circuit 400.

The pitch pre-filter circuit 400 receives the delay T (pitch period) from the voiced/unvoiced discriminating circuit 200, performs pitch-filtering for the sound source signal v(n) from the gain circuit 300 according to expression (3) given below, and outputs the result to the synthesis filter circuit 170.

$$v'(n)=v(n)+\beta p(n-T) \quad (3)$$

The transcoder in this embodiment uses the pitch pre-filter circuit 400 for the sound source signal using the delay and therefore can produce a good sound-quality band-extended signal. The third embodiment is as described above.

As in the modification of the second embodiment, a periodic signal generation circuit may be used also in this embodiment instead of the adaptive codebook circuit 110. In this case, the periodic signal generation circuit receives the signal from the voiced/unvoiced discriminating circuit 200, calculates the pitch period, generates a periodic signal based on the pitch period, and outputs the generated periodic signal to the gain circuit 300.

Figure 4:
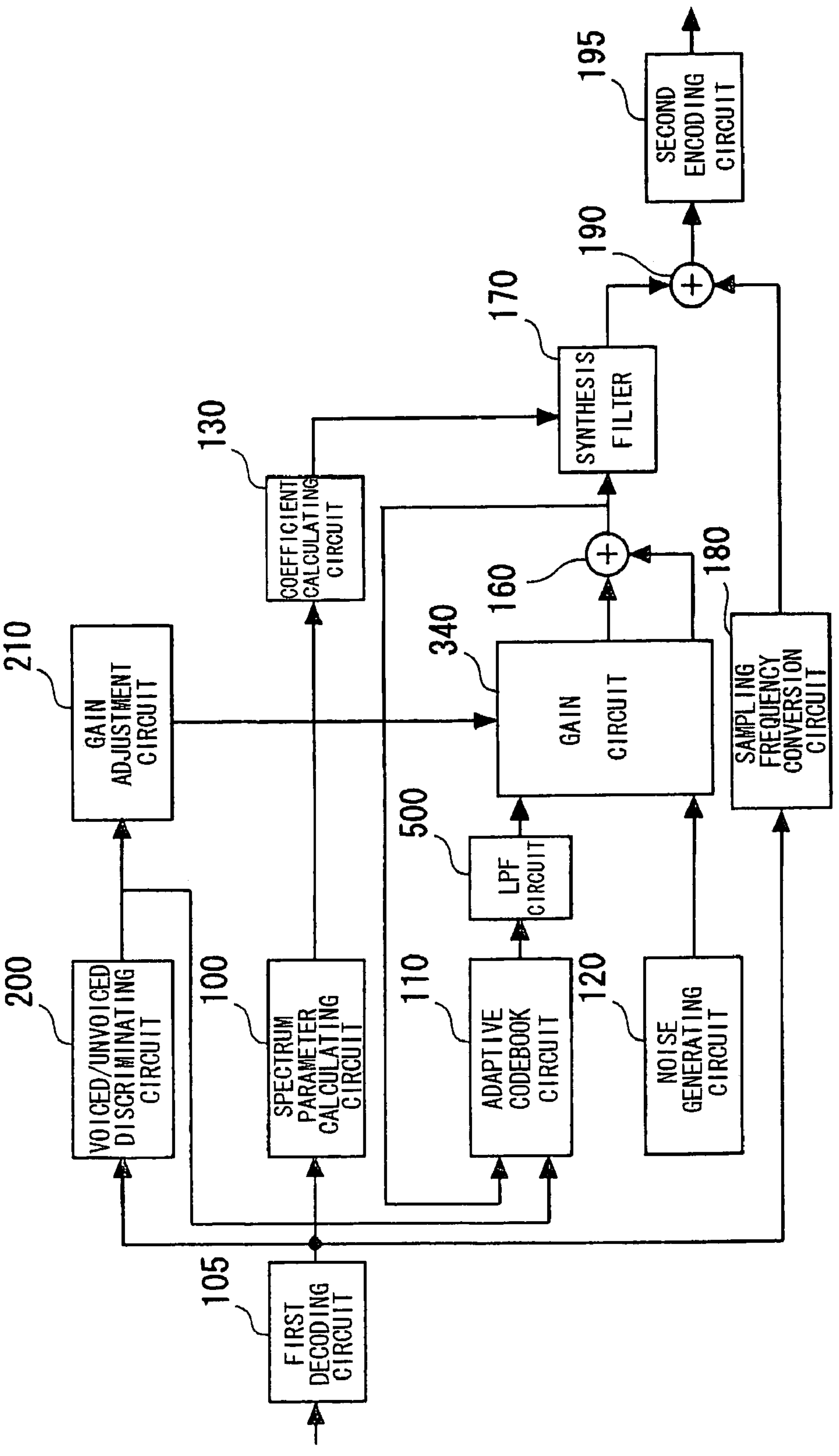
FIG. 4 is a diagram showing the configuration of a fourth embodiment of the present invention.

FIG. 4 is a block diagram showing the configuration of a fourth embodiment of the present invention. Referring to FIG. 4, a transcoder in the fourth embodiment of the present invention comprises a first decoding circuit 105, a spectrum parameter calculation circuit 100, an adaptive codebook circuit 110, a noise generation circuit 120, a coefficient calculation circuit 130, a gain circuit 340, an adder 160, a synthesis filter circuit 170, a sampling frequency conversion circuit 180, an adder 190, a second encoding circuit 195, a voiced/ unvoiced discriminating circuit 200, a gain adjustment circuit 210, and a low-pass filter circuit 500. In FIG. 4, the same reference numeral is used to denote the same or equivalent element in FIG. 2. The following mainly describes the difference from the second embodiment and omits the description of the same elements as those in FIG. 2. Referring to FIG. 4, the low-pass filter circuit 500 that receives the output of the adaptive codebook circuit 110 is provided.

Using expression (4), the low-pass filter (LPF) circuit 500 allows the low-frequency signal of the output signal from the adaptive codebook circuit 110 to pass and outputs the result to the gain circuit 340.

$$p'(n)=p(n)*h(n) \quad (4)$$

The cutoff frequency of the low-pass filter circuit 500 is predetermined, for example, to be 6 kHz. In expression (4), h(n) indicates the impulse response of the low-pass filter and the symbol "*" indicates convolution operation, respectively.

The fourth embodiment of the present invention is as described above. As in the modification of the second embodiment, a periodic signal generation circuit may be used also in the fourth embodiment of the present invention instead of the adaptive codebook circuit 110. In this case, the periodic signal generation circuit receives the signal from the voiced/unvoiced discriminating circuit 200, calculates the pitch period, generates a periodic signal based on the pitch period, and outputs the generated periodic signal to the gain circuit 340.

Figure 5:
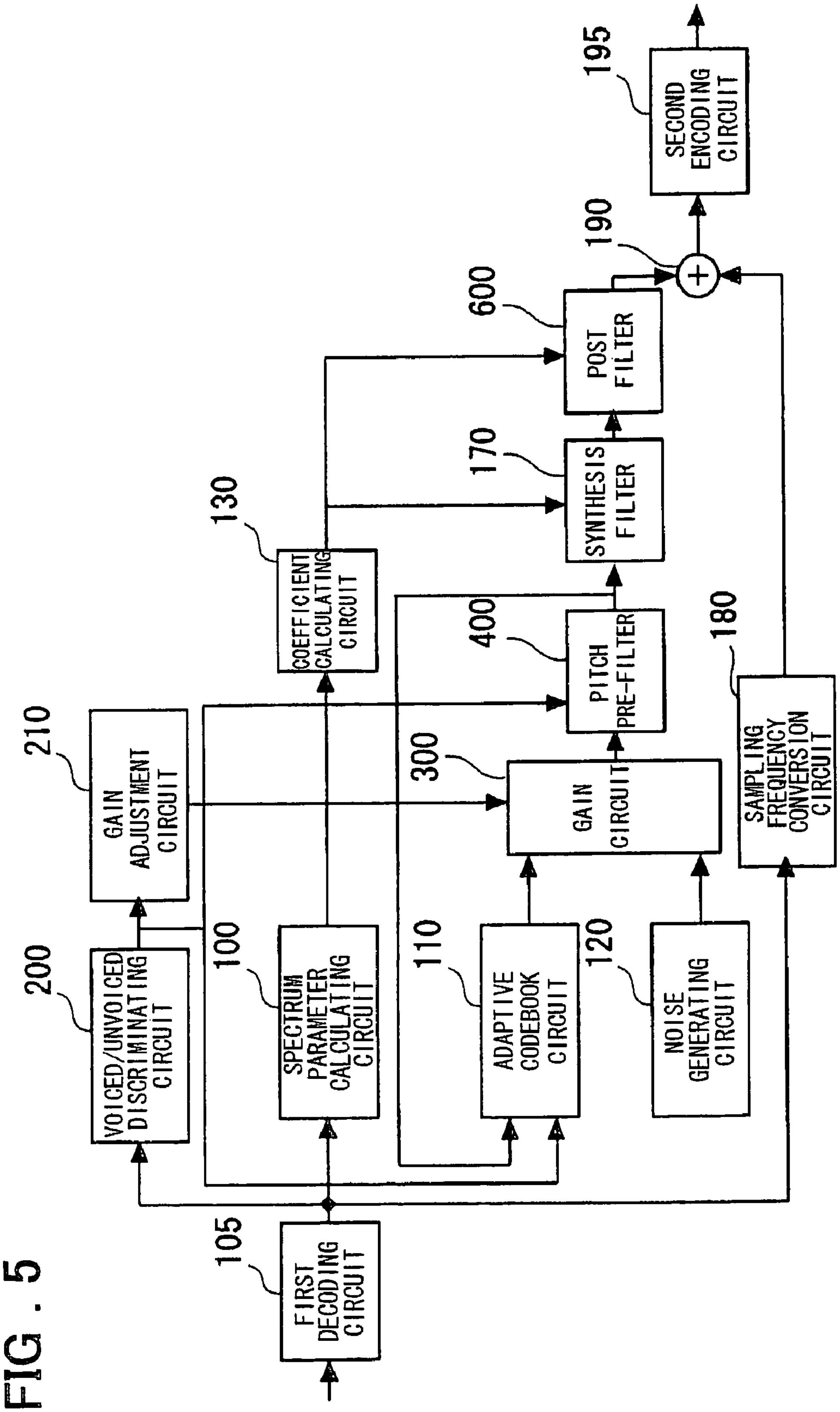
FIG. 5 is a diagram showing the configuration of a fifth embodiment of the present invention.

FIG. 5 is a block diagram showing the configuration of a fifth embodiment of the present invention. Referring to FIG. 5, a transcoder in the fifth embodiment of the present invention comprises a first decoding circuit 105, a spectrum parameter calculation circuit 100, an adaptive codebook circuit 110, a noise generation circuit 120, a coefficient calculation circuit 130, a gain circuit 300, a synthesis filter circuit 170, a sampling frequency conversion circuit 180, an adder 190, a second encoding circuit 195, a voiced/unvoiced discriminating circuit 200, a gain adjustment circuit 210, a pitch pre-filter 400, and a post filter 600. In FIG. 5, the same reference numeral is used to denote the same or equivalent element in FIG. 3. The following mainly describes the difference from the third embodiment and omits the description of the same elements as those in FIG. 3. The configuration of this embodiment is similar to that of the third embodiment except that the post filter 600 is added.

The post filter 600 receives coefficients (filter coefficients) from the coefficient calculation circuit 130, gives weight to the coefficients, performs post filtering according to expression (5), and outputs the resulting output to the adder 190.

$$y'(n)=y(n)-\Sigma a_i\gamma_1^i y(n-i)+\Sigma a_i\gamma_2^i y'(n-i) \quad (5)$$

This embodiment uses the post filter 600 to generate a good sound-quality band-extended signal. The fifth embodiment is as described above.

As in the modification of the second embodiment, a periodic signal generation circuit may be used also in the fifth embodiment of the present invention instead of the adaptive codebook circuit 110. In this case, the periodic signal generation circuit receives the signal from the voiced/unvoiced discriminating circuit 200, calculates the pitch period, generates a periodic signal based on the pitch period, and outputs the generated periodic signal to the gain circuit 300.

The configurations of the embodiments may be combined; for example, the post-filter described in the fifth embodiment described above may be used in the first embodiment. Although the present invention has been described using the embodiments, it is to be understood that the present invention is not limited to the configurations of the embodiments described above but that changes and modifications apparent to those skilled in the art within the scope of the claims of the present invention are also included in the present invention.

INDUSTRIAL APPLICABILITY

As described above, a good sound-quality, band-extended signal is generated according to the present invention as described above when code encoded in a first encoding method is converted to code encoded in a second encoding method. The present invention is, therefore, advantageously applicable to a code conversion device such as a transcoder.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A transcoder that performs inter-conversion between a code encoded in accordance with a first encoding method and a code encoded in accordance with a second encoding method, comprising:

- a first decoding unit, receiving a code encoded by the first encoding method, for decoding the received code in accordance with a first decoding method to output a decoded signal;
- a spectrum parameter calculating unit, receiving the decoded signal, for calculating a spectrum parameter representing spectrum characteristics to output the resultant spectrum parameter;
- a noise generating unit for generating a noise signal;
- a coefficient calculating unit for shifting a frequency of the spectrum parameter, and calculating filter coefficients to output the filter coefficients;
- a gain unit for applying a gain to the output signal from said noise generating unit to output the resulting signal;
- a synthesis filter unit including a synthesis filter configured by the filter coefficients from said coefficient calculating unit, said synthesis filter, receiving the output signal from said gain unit, for passing the output signal through the synthesis filter to output a signal of a band required for band conversion;
- a sampling frequency conversion circuit for converting the decoded signal using a predetermined sampling frequency to output the resulting signal;
- an adder for summing the output signal of said sampling frequency conversion circuit and the output signal of said synthesis filter unit to output the resulting signal; and
- a second encoding unit, receiving the output signal of said adder for encoding the output signal in accordance with the second encoding method to produce and output a second code.

2. A transcoder that performs inter-conversion between a code encoded in accordance with a first encoding method and a code encoded in accordance with a second encoding method, comprising:

- a first decoding unit, receiving a code encoded in accordance with the first encoding method, for decoding the received code in accordance with a first decoding method to output a decoded signal;

a spectrum parameter calculating unit, receiving the decoded signal, for calculating a spectrum parameter representing spectrum characteristics;

an adaptive codebook unit for calculating a pitch period from the decoded signal and generating an adaptive codebook component based on the pitch period and a past sound source signal;

a noise generating unit for generating a noise signal;

a coefficient calculating unit for shifting a frequency of the spectrum parameter and calculating filter coefficients;

a gain unit for applying a gain to at least one of the output signal of said noise generating unit and the output signal of said adaptive codebook unit and adding up two types of signals (two signals generated by multiplying the output signal of at least one of the adaptive codebook unit and the noise generating unit by the gain) to output a sound source signal;

a synthesis filter unit including a synthesis filter configured by the filter coefficients from said coefficient calculating unit, synthesis filter unit receiving the sound source signal from said gain unit, and passing the sound source signal through the synthesis filter to output a signal of a band required for band conversion;

a sampling frequency conversion circuit for converting the decoded signal using a predetermined sampling frequency to output the resulting signal;

an adder for summing the output signal of said sampling frequency conversion circuit and the output signal of said synthesis filter unit to output the resulting signal; and a second encoding unit, receiving the output signal of said adder and encodes the output signal in accordance with the second encoding method to produce and output a second code.

3. A transcoder that performs inter-conversion between a code encoded in accordance with a first encoding method and a code encoded in accordance with a second encoding method, comprising:

a first decoding unit, receiving a code encoded in accordance with the first encoding method, for decoding the received code in accordance with a first decoding method to output a decoded signal;

a spectrum parameter calculating unit, receiving the decoded signal for calculating a spectrum parameter representing spectrum characteristics;

an adaptive codebook unit for calculating a pitch period from the decoded signal and generating an adaptive codebook component based on the pitch period and a past sound source signal;

a noise generating unit for generating a noise signal;

a coefficient calculating unit for shifting a frequency of the spectrum parameter and calculating filter coefficients;

a gain unit for applying a gain to at least one of the output signal of said noise generating unit and the output signal of said adaptive codebook unit to add up two types of signals (two signals generated by multiplying the output signal of at least one of the adaptive codebook unit and the noise generating unit by the gain) to output a sound source signal;

a pitch pre-filter for performing pre-filtering processing for the sound source signal from said gain unit using the pitch period;

a synthesis filter unit including a synthesis filter configured by the filter coefficients from said coefficient calculating unit, said synthesis filter unit passing the output signal of said pitch pre-filter through the synthesis filter to output a signal of a band required for band conversion;

a sampling frequency conversion circuit for converting the decoded signal using a predetermined sampling frequency to output the resulting signal;

an adder for summing the output signal of said sampling frequency conversion circuit and the output signal of said synthesis filter unit to output the resulting signal; and a second encoding unit, receiving the output signal of said adder, for encoding the output signal in accordance with the second encoding method to produce and output a second code.

4. A transcoder that performs inter-conversion between a code encoded in accordance with a first encoding method and a code encoded in accordance with a second encoding method, comprising:

a first decoding unit, receiving a code encoded in accordance with the first encoding method, for decoding the received code in accordance with a first decoding method, to output a decoded signal;

a spectrum parameter calculating unit, receiving the decoded signal, for calculating a spectrum parameter representing spectrum characteristics;

a periodic signal generation unit for calculating a pitch period from the decoded signal and generating a periodic signal using the pitch period;

a noise generating unit for generating a noise signal;

a coefficient calculating unit for shifting a frequency of the spectrum parameter and calculating filter coefficients;

a gain unit for applying a gain to at least one of the output signal of said noise generating unit and the output signal of said periodic signal generation unit and adding up two types of signals (two signals generated by multiplying the output signal of at least one of the periodic signal generation unit and the noise generating unit by the gain) to output a sound source signal;

a synthesis filter unit including a synthesis filter configured by the filter coefficients from said coefficient calculating unit, said synthesis filter unit receiving the sound source signal from said gain unit, and passing the sound source signal through the synthesis filter to output a signal of a band required for band conversion;

a sampling frequency conversion circuit for converting the decoded signal using a predetermined sampling frequency to output the resulting signal;

an adder for summing the output signal of said sampling frequency conversion circuit and the output signal of said synthesis filter unit and outputs the resulting signal; and a second encoding unit, receiving the output signal of said adder and encodes the output signal in accordance with the second encoding method to produce and output a second code.

5. A transcoder that performs inter-conversion between a code encoded in accordance with a first encoding method and a code encoded in accordance with a second encoding method, comprising:

a first decoding unit, receiving a code encoded in accordance with the first encoding method, for decoding the received code in accordance with a first decoding method, to output a decoded signal;

a spectrum parameter calculating unit, receiving the decoded signal, for calculating a spectrum parameter representing spectrum characteristics;

a periodic signal generation unit for calculating a pitch period from the decoded signal and generating a periodic signal using the pitch period;

a noise generating unit for generating a noise signal;

a coefficient calculating unit for shifting a frequency of the spectrum parameter and calculating filter coefficients;

a gain unit for applying a gain to at least one of the output signal of said noise generating unit and the output signal of said periodic signal generation unit and adding up two types of signals (two signals generated by multiplying the output signal of at least one of the periodic signal generation unit and the noise generating unit by the gain) to output a sound source signal;

a pitch pre-filter for performing pre-filtering processing for the sound source signal from said gain unit using the pitch period;

a synthesis filter unit including a synthesis filter configured by the filter coefficients from said coefficient calculating unit, said synthesis filter unit passing the output signal of said pitch pre-filter through the synthesis filter to output a signal of a band required for band conversion;

a sampling frequency conversion circuit for converting the decoded signal using a predetermined sampling frequency to output the resulting signal;

an adder for summing the output signal of said sampling frequency conversion circuit and the output signal of said synthesis filter unit and outputs the resulting signal; and a second encoding unit, receiving the output signal of said adder and encodes the output signal in accordance with the second encoding method to produce and output a second code.

6. The transcoder as defined in claim 2, further comprising a low-pass filter, receiving the output signal of said adaptive codebook unit for allowing a signal with a frequency equal to or lower than a predetermined cutoff frequency to pass through for output.

7. The transcoder as defined in claim 1, further comprising a post filter configured by weighting coefficients generated by giving weight to the filter coefficients from said coefficient calculating unit, wherein the output signal of said synthesis filter unit is passed through said post filter to reproduce a band-converted signal, and said adder sums the output signal of said post filter, instead of the output signal of said synthesis filter unit, and the output signal of said sampling frequency conversion circuit and outputs the resulting signal.

8. The transcoder as defined in claim 2, wherein said adaptive codebook unit comprises an adaptive codebook circuit that receives a pitch period from a voiced/unvoiced discriminating circuit, which receives the decoded signal from said first decoding circuit and outputs voiced/unvoiced discrimination information and pitch period information, and a sound source signal that is input to said synthesis filter unit.

9. The transcoder as defined in claim 4, wherein said periodic signal generation unit comprises a periodic signal generation circuit that receives a pitch period from a voiced/unvoiced discriminating circuit which receives the decoded signal from said first decoding unit and outputs voiced/unvoiced discrimination information and pitch period information.

10. The transcoder as defined in claim 3, wherein said pitch pre-filter receives a pitch period from a voiced/unvoiced discriminating circuit, which receives the decoded signal from said first decoding unit and outputs voiced/unvoiced discrimination information and pitch period information, and performs pitch pre-filtering for a sound source signal from said gain unit and outputs the resulting signal to said synthesis filter unit.

11. The transcoder as defined in claim 1, further comprising:

a voiced/unvoiced discriminating circuit, receiving the decoded signal from said first decoding unit to output voiced/unvoiced discrimination information; and a gain adjustment circuit, receiving the voiced/unvoiced discrimination information from said voiced/unvoiced determination unit for adjusting the gain to be applied to the output signal from said noise signal generation unit according to whether the signal is voiced or unvoiced, wherein said gain unit comprises a gain circuit that applies the gain to the output signal from said noise generating unit in response to the gain signal from said gain adjustment circuit.

12. The transcoder as defined in claim 2, further comprising:

a voiced/unvoiced discriminating circuit, receiving the decoded signal from said first decoding unit to output voiced/unvoiced discrimination information and pitch period information; and a gain adjustment circuit, receiving the voiced/unvoiced discrimination information from said voiced/unvoiced determination unit, for adjusting the gain to be applied to the adaptive codebook signal and to the output signal from said noise generating unit according to whether the signal is voiced or unvoiced, wherein said gain unit comprises a gain circuit that receives the gain signal from said gain adjustment circuit, multiplies the gain to the output signal of at least one of said adaptive codebook unit and said noise generating unit, and outputs the result; and a second adder for summing two types of signals, which are output from said gain circuit and which correspond respectively to the output signal of said adaptive codebook unit and the noise generating unit, to output the result;

an output signal of said second adder being supplied to said synthesis filter unit and said adaptive codebook unit.

13. The transcoder as defined in claim 4, further comprising:

a voiced/unvoiced discriminating circuit, receiving the decoded signal from said first decoding unit to output voiced/unvoiced discrimination information and pitch period information; and a gain adjustment circuit, receiving the voiced/unvoiced discrimination information from said voiced/unvoiced determination unit, for adjusting the gain to be applied to the output signals from said periodic signal generation unit and said noise generating unit according to whether the signal is voiced or unvoiced, wherein said gain unit comprises a gain circuit that receives the gain signal from said gain adjustment circuit, multiplies the gain to the output signal of at least one of said periodic signal generation unit and said noise generating unit, and outputs the result; and a second adder for summing two types of signals, which are output from said gain circuit and which correspond respectively to the output signal of said periodic signal generation unit and said noise generating unit, and outputs the result;

an output signal of said second adder being supplied to said synthesis filter unit.

14. The transcoder as defined in claim 1, wherein said coefficient calculating unit shifts a frequency of the spectrum parameter to a higher frequency and calculates the filter coefficients, said synthesis filter unit reproduces a band extended signal, and said sampling frequency conversion circuit receives the decoded signal from said first decoding unit, up-samples the received signal to a predetermined sampling frequency, and outputs the result.

15. The transcoder as defined in claim 1, wherein said noise generating unit generates the noise signal for a length of time equal to a frame length, said noise signal having an average amplitude thereof normalized to a predetermined level and a band thereof limited.

16. The transcoder as defined in claim 11, wherein said voiced/unvoiced discriminating circuit calculates a normalized auto-correlation function of the decoded signal up to a predetermined delay time to find a maximum value of the normalized auto-correlation function, determines that the signal is voiced if the maximum value is larger than a predetermined threshold value and unvoiced if not, and outputs the determination result to said gain adjustment circuit as the voiced/unvoiced discrimination information.

17. The transcoder as defined in claim 12, wherein said voiced/unvoiced discriminating circuit calculates a normalized auto-correlation function of the decoded signal up to a predetermined delay time to find a maximum value of the normalized auto-correlation function, determines that the signal is voiced if the maximum value is larger than a predetermined threshold value and unvoiced if not, outputs the determination result to said gain adjustment circuit as the voiced/unvoiced discrimination information and, for a voiced frame, supplies a delay value that maximizes the normalized auto-correlation function to said adaptive codebook unit as the pitch period.

18. The transcoder as defined in claim 13, wherein said voiced/unvoiced discriminating circuit calculates a normalized auto-correlation function of the decoded signal up to a predetermined delay time to find a maximum value of the normalized auto-correlation function, determines that the signal is voiced if the maximum value is larger than a predetermined threshold value and unvoiced if not, outputs the determination result to said gain adjustment circuit as the voiced/unvoiced discrimination information and, for a voiced frame, supplies a delay value that maximizes the normalized auto-correlation function to said periodic signal generation unit as the pitch period.

19. A code conversion method for use by a transcoder that performs inter-conversion between a code encoded in accordance with a first encoding method and a code encoded in accordance with a second encoding method, comprising:

a step of decoding a code in accordance with a first decoding method and outputting a decoded signal, said code encoded in accordance with the first encoding method;

a step of calculating a spectrum parameter from the decoded signal and outputting the spectrum parameter, said spectrum parameter representing spectrum characteristics;

a step of shifting a frequency of the spectrum parameter, calculating filter coefficients, and outputting the calculated filter coefficients;

a step of applying a gain to an output signal from a noise generating unit;

a step of passing the output signal having the gain applied thereto, through a synthesis filter to output a signal of a band required for band conversion, said synthesis filter configured by the filter coefficients;

a step of adding up a signal, which is generated by converting the decoded signal using a predetermined sampling frequency, and the output signal of said synthesis filter; and a step of encoding the addition result in accordance with the second encoding method to produce and output a second code.

20. A code conversion method for use by a transcoder that performs inter-conversion between a code encoded in accordance with a first encoding method and a code encoded in accordance with a second encoding method, comprising:

a step of decoding a code in accordance with a first decoding method and outputting a decoded signal, said code encoded in accordance with the first encoding method;

a step of calculating a spectrum parameter from the decoded signal and outputting the spectrum parameter, said spectrum parameter representing spectrum characteristics;

a step of calculating a pitch period from the decoded signal and, based on the pitch period and a past sound source signal, generating an adaptive codebook component;

a step of shifting a frequency of the spectrum parameter, calculating filter coefficients, and outputting the calculated filter coefficients;

a step of applying a gain to at least one of a noise output from a noise generating unit and the adaptive codebook component and adding up two types of signals (two signals generated by multiplying the output signal of at least one of the adaptive codebook unit and the noise generating unit by the gain) to output a sound source signal;

a step of passing the sound source signal through a synthesis filter to output a signal of a band required for band conversion, said synthesis filter configured by the filter coefficients;

a step of adding up a signal, which is generated by converting the decoded signal using a predetermined sampling frequency, and the output signal of said synthesis filter; and a step of encoding the addition result in accordance with the second encoding method to produce and output a second code.

21. A code conversion method for use by a transcoder that performs inter-conversion between a code encoded in accordance with a first encoding method and a code encoded in accordance with a second encoding method, comprising:

a step of decoding a code in accordance with a first decoding method and outputting a decoded signal, said code encoded in accordance with the first encoding method;

a step of calculating a spectrum parameter from the decoded signal and outputting the spectrum parameter, said spectrum parameter representing spectrum characteristics;

a step of calculating a pitch period from the decoded signal and, based on the pitch period and a past sound source signal, generating an adaptive codebook component;

a step of shifting a frequency of the spectrum parameter, calculating filter coefficients, and outputting the calculated filter coefficients;

a step of applying a gain to at least one of a noise output from a noise generating unit and the adaptive codebook component and adding up two types of signals (two signals generated by multiplying the output signal of at least one of the adaptive codebook unit and the noise generating unit by the gain) to output a sound source signal;

a step of performing pitch pre-filtering processing for the sound source signal using the pitch period;

a step of passing the pitch pre-filtered signal through a synthesis filter to output a signal of a band required for band conversion, said synthesis filter configured by the filter coefficients;

a step of adding up a signal, which is generated by converting the decoded signal using a predetermined sampling frequency, and the output signal of said synthesis filter; and a step of encoding the addition result in accordance with the second encoding method to produce and output a second code.

22. A code conversion method for use by a transcoder that performs inter-conversion between a code encoded in accordance with a first encoding method and a code encoded in accordance with a second encoding method, comprising:

a step of decoding a code in accordance with a first decoding method and outputting a decoded signal, said code encoded in accordance with the first encoding method;

a step of calculating a spectrum parameter from the decoded signal and outputting the spectrum parameter, said spectrum parameter representing spectrum characteristics;

a step of calculating a pitch period from the decoded signal and generating a periodic signal using the pitch period;

a step of shifting a frequency of the spectrum parameter, calculating filter coefficients, and outputting the calculated filter coefficients;

a step of applying a gain to at least one of a noise output from a noise generating unit and the periodic signal and adding up two types of signals (two signals generated by multiplying the output signal of at least one of the periodic signal and the noise generating unit by the gain) to output a sound source signal;

a step of passing the sound source signal through a synthesis filter to output a signal of a band required for band conversion, said synthesis filter configured by the filter coefficients;

a step of adding up a signal, which is generated by converting the decoded signal using a predetermined sampling frequency, and the output signal of said synthesis filter; and a step of encoding the addition result in accordance with the second encoding method to produce and output a second code.

23. A code conversion method for use by a transcoder that performs inter-conversion between a code encoded in accordance with a first encoding method and a code encoded in accordance with a second encoding method, comprising:

a step of decoding a code in accordance with a first decoding method and outputting a decoded signal, said code encoded in accordance with the first encoding method;

a step of calculating a spectrum parameter from the decoded signal and outputting the spectrum parameter, said spectrum parameter representing spectrum characteristics;

a step of calculating a pitch period from the decoded signal and generating a periodic signal using the pitch period;

a step of shifting a frequency of the spectrum parameter, calculating filter coefficients, and outputting the calculated filter coefficients;

a step of applying a gain to at least one of a noise output from a noise generating unit and the periodic signal and adding up two types of signals (two signals generated by multiplying the output signal of at least one of the periodic signal and the noise generating unit by the gain) to output a sound source signal;

a step of performing pitch pre-filtering processing for the sound source signal using the pitch period;

a step of passing the pitch pre-filtered signal through a synthesis filter to output a signal of a band required for band conversion, said synthesis filter configured by the filter coefficients;

a step of adding up a signal, which is generated by converting the decoded signal using a predetermined sampling frequency, and the output signal of said synthesis filter; and a step of encoding the addition result in accordance with the second encoding method to produce and output a second code.

24. The code conversion method as defined in claim 19, further comprising:

a step of passing the output signal of said synthesis filter through a post filter for reproducing a band converted signal, said post filter configured by weighted coefficients generated by applying weight to the filter coefficients; and a step of adding, not the output signal of said synthesis filter, but an output signal of said post filter to the signal generated by converting the decoded signal using a predetermined sampling frequency.

25. The code conversion method as defined in claim 20, further comprising a step of performing low-pass filtering of the adaptive codebook component.

26. The code conversion method as defined in claim 19, further comprising a step of generating and outputting, by said noise generating unit, a noise signal for a length of time equal to a frame length, said noise signal having an average amplitude thereof normalized to a predetermined level and a band thereof limited.

27. The code conversion method as defined in claim 19, further comprising:

a step of determining, by a voiced/unvoiced determination unit that receives the decoded signal, if the signal is voiced/unvoiced and outputting voiced/unvoiced discrimination information;

a step of adjusting a gain of an output signal from said noise generating unit according to whether the voiced/unvoiced discrimination information is voiced/unvoiced; and a step of applying the adjusted gain to the output signal from said noise generating unit.

28. The code conversion method as defined in claim 20, further comprising:

a step of determining, by a voiced/unvoiced determination unit that receives the decoded signal, if the signal is voiced/unvoiced and outputting voiced/unvoiced discrimination information and pitch period information;

a step of adjusting the gain of at least one of the adaptive codebook signal and the output signal from said noise generating unit according to whether the voiced/unvoiced discrimination information from said voiced/unvoiced determination unit is voiced/unvoiced;

a step of multiplying at least one of the adaptive codebook signal and the output signal of said noise generating unit by the adjusted gain signal and outputting the resulting signal; and a step of adding the adaptive codebook signal and the output signal of said noise generating unit, at least one of which is multiplied by the gain, and outputting the resulting addition signal as the sound source signal.

29. The code conversion method as defined in claim 22, further comprising:

a step of determining, by a voiced/unvoiced determination unit that receives the decoded signal, if the signal is voiced/unvoiced and outputting voiced/unvoiced discrimination information and pitch period information;

a step of adjusting the gain of at least one of the periodic signal and the output signal from said noise generating unit according to whether the voiced/unvoiced discrimination information from said voiced/unvoiced determination unit is voiced/unvoiced;

a step of multiplying at least one of the periodic signal and the output signal of said noise generating unit by the adjusted gain and outputting the resulting signal; and a step of adding the periodic signal and the output signal of said noise generating unit, at least one of which is multiplied by the gain, and outputting the resulting addition signal as the sound source signal.

30. The code conversion method as defined in claim 27, further comprising a step, by a voiced/unvoiced discriminating circuit, of calculating a normalized auto-correlation function of the decoded signal up to a predetermined delay time to find a maximum value of the normalized auto-correlation function, determining that the signal is voiced if the maximum value is larger than a predetermined threshold value and unvoiced if not, and outputting the determination result as the voiced/unvoiced discrimination information.

31. The code conversion method as defined in claim 28, further comprising a step, by said voiced/unvoiced discriminating circuit, of calculating a normalized auto-correlation function of the decoded signal up to a predetermined delay time to find a maximum value of the normalized auto-correlation function, determining that the signal is voiced if the maximum value is larger than a predetermined threshold value and unvoiced if not, outputting the determination result as the voiced/unvoiced discrimination information and, for a voiced frame, supplying a delay value that maximizes the normalized auto-correlation function as the pitch period.

* * * * *